(12) United States Patent
Alam et al.

(10) Patent No.: US 10,972,340 B2
(45) Date of Patent: Apr. 6, 2021

(54) PROVISIONING HIGH PERFORMANCE COMPUTING CLUSTERS

(71) Applicant: MICROSOFT TECHNOLOGY LICENSING, LLC, Redmond, WA (US)

(72) Inventors: Salim Alam, Mercer Island, WA (US); Tianchi Ma, Sammamish, WA (US); Gregory Wray Teather, Lynnwood, WA (US); Dandan He, Redmond, WA (US); Matthew Charles LaGrandeur, Seattle, WA (US); Ruiyi Wang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 60 days.

(21) Appl. No.: 16/181,013

(22) Filed: Nov. 5, 2018

(65) Prior Publication Data
US 2019/0075021 A1 Mar. 7, 2019

Related U.S. Application Data

(63) Continuation of application No. 15/385,631, filed on Dec. 20, 2016, now Pat. No. 10,142,175, which is a continuation of application No. 14/226,591, filed on Mar. 26, 2014, now Pat. No. 9,560,166, which is a continuation of application No. 13/327,342, filed on Dec. 15, 2011, now Pat. No. 8,725,798.

(51) Int. Cl.
*G06F 15/177* (2006.01)
*H04L 12/24* (2006.01)
*H04L 29/08* (2006.01)
*G06F 9/50* (2006.01)
*H04L 29/06* (2006.01)

(52) U.S. Cl.
CPC ........ *H04L 41/0806* (2013.01); *G06F 9/5072* (2013.01); *H04L 29/08072* (2013.01); *H04L 41/22* (2013.01); *H04L 67/10* (2013.01); *H04L 67/42* (2013.01); *H04L 69/329* (2013.01)

(58) Field of Classification Search
None
See application file for complete search history.

(56) References Cited

U.S. PATENT DOCUMENTS

| | | |
|---|---|---|
| 8,412,810 B1 | 4/2013 | Tompkins |
| 8,484,355 B1 | 7/2013 | Lochhead et al. |
| 8,725,798 B2 * | 5/2014 | Alam ................ G06F 9/5072 709/203 |
| 10,049,335 B1 * | 8/2018 | Narkier ............ G06Q 10/0637 |

(Continued)

*Primary Examiner* — Phuoc H Nguyen
(74) *Attorney, Agent, or Firm* — Workman Nydegger

(57) ABSTRACT

Provisioning a cloud based high performance computing cluster. The method includes from a cloud based provisioning service deployed in a cloud based computing provider, providing a user interface. The method further includes receiving user input at the cloud based provisioning service from the user interface. The method further includes from the user input, determining a configuration for a cloud based user service for the user. Using the cloud based provisioning service, the method further includes provisioning the cloud based user service for the user, in the cloud, based on the determined configuration.

20 Claims, 9 Drawing Sheets

(56) References Cited

U.S. PATENT DOCUMENTS

| | | | |
|---|---|---|---|
| 10,142,175 B2* | 11/2018 | Alam | G06F 9/5072 |
| 2010/0333092 A1* | 12/2010 | Stefansson | G06F 9/44505 |
| | | | 718/100 |
| 2011/0145392 A1 | 6/2011 | Dawson et al. | |
| 2011/0224509 A1* | 9/2011 | Fish | G06F 21/32 |
| | | | 600/301 |
| 2016/0188323 A1* | 6/2016 | Nagaraja | G06F 8/61 |
| | | | 717/101 |

* cited by examiner sign in                                              302

Windows Live ID:

| example555@hotmail.com |

Password:

|                        |

Forgot your password?

☐ Keep me signed in

[ Sign in ]

Not your computer?
Get a single code to sign in with

*Figure 3* azure account information

Before we get started we'll need some information about your existing Windows Azure account. More information about Azure Accounts.

Subscription ID:

| id123abc |
|---|

Administrator credentials
Create a username and password – these credentials will be used for the cluster administrator account, and can be used to Remote Desktop to the cluster Username:

| administrator |
|---|

Password:

|   |
|---|

*This password should be different than your Live ID Password*

Certificate:
In order for this portal to talk with the Azure, you must upload a certificate to your existing Azure account.

Step 1:   Download this certificate file
Step 2:   Sign in to the Azure Management Portal. In the {SOMETHING} tab, press {SOMETHING} and upload the certificate file.

☑ Automatically generate new Azure Account information
    Uncheck this box if you would like to specify existing Azure Service, Storage Account, Storage Key, and SQL Account Information.

[ Save ]

*Figure 4A*

Certificate:
In order for this portal to talk with the Azure, you must upload a certificate to your existing Azure account.

Step 1: Download this certificate file
Step 2: Sign in to the Azure Management Portal. In the {SOMETHING} tab, press {SOMETHING} and upload the certificate file.

☐ Automatically generate new Azure Account information

Azure Service

Account Storage

Storage Key

SQL Account

If the checkbox was unchecked, this form will be dynamically added below the checkbox Save

*Figure 4B* new cluster

Clusters will have as many compute nodes as specified, plus an additional Medium node that will serve as the cluster's Head Node.

Number of nodes:

4

Size of Nodes:

Medium

Deployment roles:
Optionally you may select additional roles for this deployment ☐ WCF Broker
☐ Link to HPC

[ Show advanced application configuration ]

[ Create new cluster ]     [ Cancel ]

*Figure 5A*

Hide advanced application configuration

Advanced application configuration:

Applications and data files can be uploaded to this new cluster. In the spaces provided below, you can either paste a local file path, or a http link to Azure blob storage.

Application file (.exe, .msi, .zip):

Data file:

Cluster startup script:

*Figure 5B*

PROVISIONING HIGH PERFORMANCE COMPUTING CLUSTERS

CROSS-REFERENCE TO RELATED APPLICATIONS

This application is a continuation of U.S. patent application Ser. No. 15/385,631, filed Dec. 20, 2016, titled "PROVISIONING HIGH PERFORMANCE COMPUTING CLUSTER", which is a continuation of Ser. No. 14/226,591, filed Mar. 26, 2014, now U.S. Pat. No. 9,560,166, issued Jan. 31, 2017, titled "PROVISIONING HIGH PERFORMANCE COMPUTING CLUSTERS", which is a continuation of Ser. No. 13/327,342, filed Dec. 15, 2011, now U.S. Pat. No. 8,725,798, issued May 13, 2014, titled "PROVISIONING HIGH PERFORMANCE COMPUTING CLUSTERS", all of which are incorporated herein by reference in their entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. A customer can rent processor time and/or network time as computing resources are needed. In particular, computing power, software, information, etc. are provided (for example, through a rental agreement) over a network, such as the Internet.

A high performance computing cluster is a grid computing environment which comprises machines or nodes that perform different functions. A "head node" is generally responsible for building out a cluster. A "head node" is also synonymous with a job scheduling functionality and may sometimes be referred to as or as having a scheduler. The deployment of a HPC cluster is a complex operation involving a large number of steps. Previous attempts to solve this problem have involved starting with an on-premise (i.e., non-cloud) hosted head node that can provision "compute nodes" in the cloud. When the head node itself is in the cloud, there is the problem of how to bootstrap the head node.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for provisioning a cloud based high performance computing cluster. The method includes from a cloud based provisioning service deployed in a cloud based computing provider, providing a user interface. The method further includes receiving user input at the cloud based provisioning service from the user interface. The method further includes, from the user input, determining a configuration for a cloud based user service for the user. Using the cloud based provisioning service, the method further includes provisioning the cloud based user service for the user, in the cloud, based on the determined configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a log-in user interface screen;

FIG. 4A illustrates a cloud service user interface;

FIG. 4B illustrates additional details of a cloud service user interface, including interface element for a user to identify existing cloud service resources;

FIG. 5A illustrates a user interface allowing a user to enter cluster configuration information;

FIG. 5B illustrates a user interface allowing a user to upload advanced cluster configuration information.

DETAILED DESCRIPTION

Embodiments may implement a provisioning web service in the cloud that can provision a cluster, including provisioning a head node in the cloud as well as other related nodes in the cloud, for a multitude of users. With this approach, the number of configuration steps can be minimized and a better overall user experience can be provided.

Figure 1:
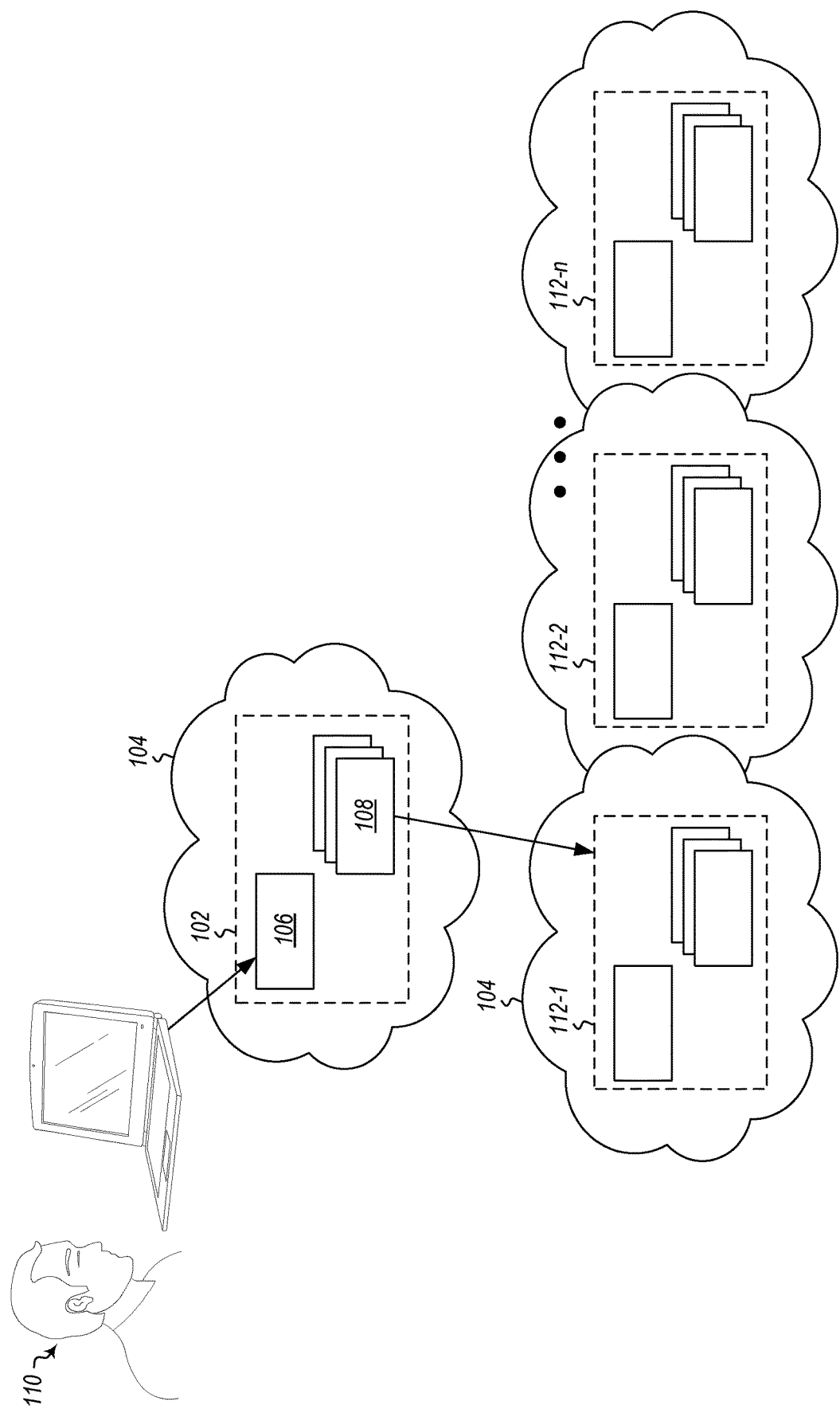
FIG. 1 illustrates a cloud computing provisioning environment.

Referring now to FIG. 1, an example is illustrated. FIG. 1 illustrates a provisioning service 102 deployed in the cloud 104. In this example, the provisioning service is a cluster deployment including a head node 106 (sometimes illustrated herein as a scheduler or as including a scheduler) and a set of worker nodes 108. The provisioning service 102 can receive user input from a user 110 indicating that the user desires to implement one or more clusters and various parameters regarding those one or more clusters.

Using the user input, the provisioning service 102 can provision one or more cloud deployed clusters. In the example illustrated, the provisioning service 102 provisions the clusters 112-1, 112-2, through 112-$n$ in the cloud 104.

A number of features may be implemented when building a cluster provisioning web service, such as the provisioning service 102. The provisioning service 102 is intended to bootstrap clusters (referred to generally as 112) that are also cloud based services, according to a specific customer configuration. Thus, embodiments may include authentication and authorization that is explicitly managed across different domains to facilitate specific customer configurations. Embodiments may include functionality to create resources in the customer's service domain. These may include services, storage, databases, etc. Embodiments may include functionality for defining how and when these resources should be created, and managed. Embodiments may include functionality to bring up and monitor long running provisioning operations, and to provide status to the user. Embodiments may include functionality for achieving a high level of scalability and availability. Details are illustrated below.

As illustrated, some embodiments may use a HPC cluster head node 106 hosted in a cloud computing system, such as Windows Azure™, to orchestrate provisioning custom HPC clusters (such as the clusters 112) in the cloud computing system.

Figure 2:
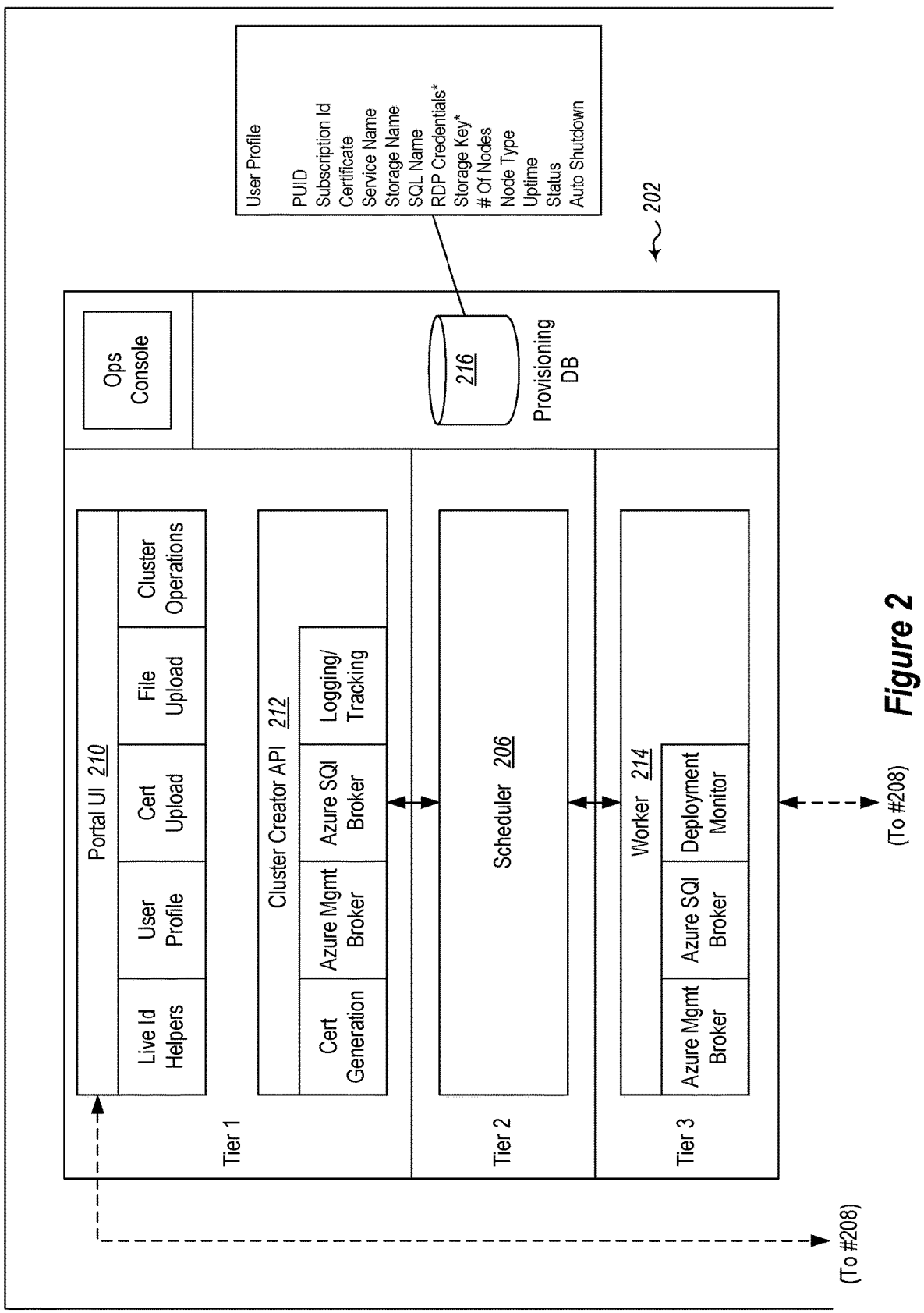
FIG. 2 illustrates a provisioning service and a provisioned service.
Figure 2:
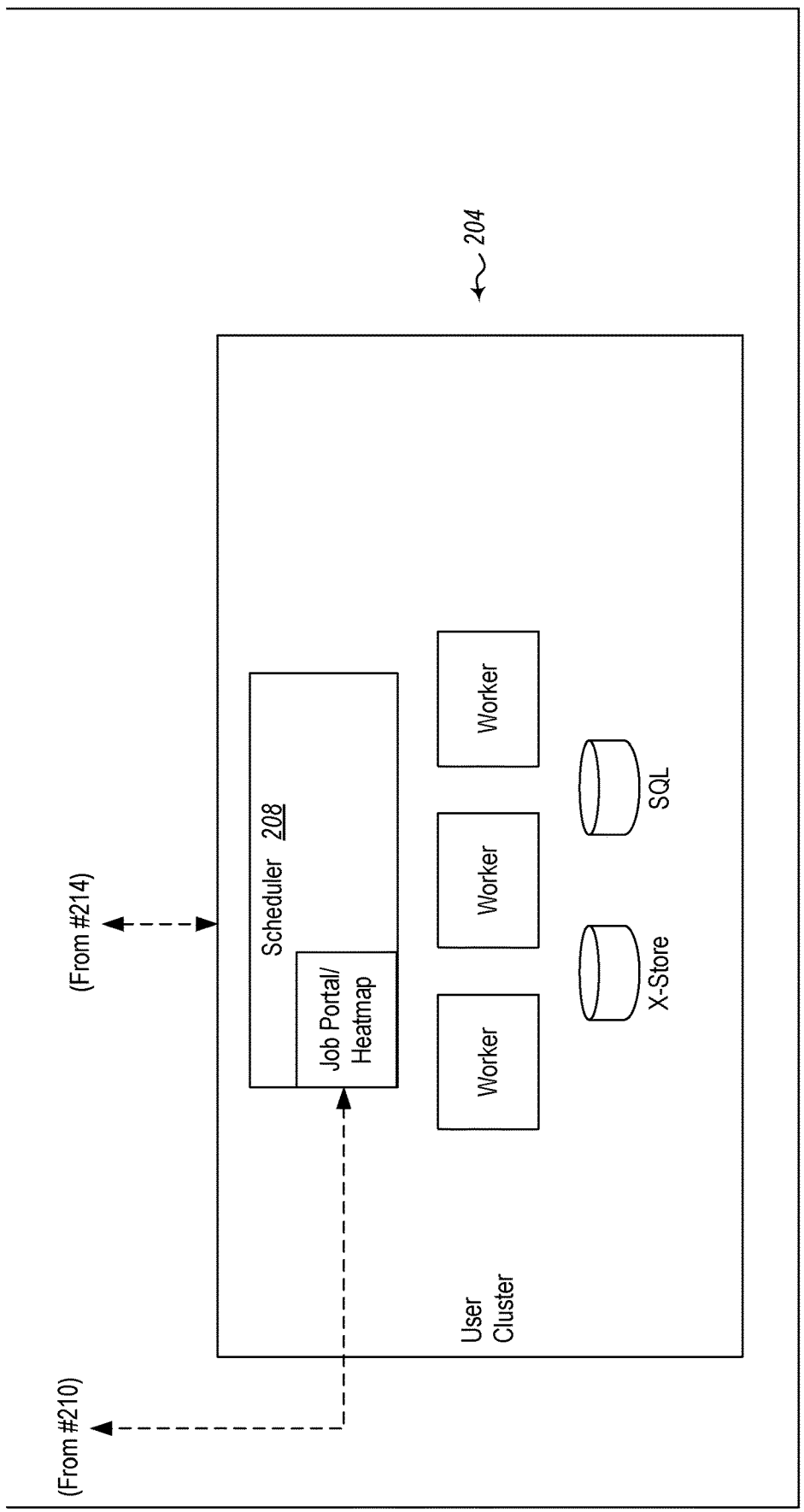

At a high level, embodiments may implement a system that is a multi-tiered web service that generates another multi-tiered web service. Referring to FIG. 2, an example is illustrated. The generating web service 202 shares a number of commonalities with the generated service 204. Both the generating service 202 and generated service 204 have job scheduler modules 206 and 208 respectively as one of their components. This gives the system a rough form of self-similarity that is leveraged to provide one or more benefits such as: re-use of code and design; ability to provide a highly scalable solution for provisioning operations that are not very CPU intensive; ability to provide the first tier to be stateless; ability to send and query status with a set of job APIs; etc.

As illustrated in FIG. 2, some embodiments may implement a portal user interface 210. The portal user interface 210 may be accessed by a user (such as user 110 illustrated in FIG. 1). The portal user interface 210 allows a user to interact with the provisioning service 202 to enter configuration setting to specify how the generated service 204 is generated. As illustrated in FIG. 2, the portal user interface 210 includes functionality for working with a user profile, uploading certificates, uploading files, and performing cluster operations.

To minimize the number of configuration settings that a user needs to set, embodiments may allow a user profile store to be used. To provision a cluster for a user, the provisioning service 202 may need to collect a user's subscription information and cloud computing management certificate for a cloud computing provider, such as Azure™ provided my Microsoft® Corporation of Redmond Wash. Certification using the certificate, in some embodiments, happens before user cluster deployment. The certificate can be downloaded by a user and stored at the service. In some embodiments, this may be done automatically such that the user does not have to manually do anything. The subscription information and certificate will allow the provisioning service 202 to bring up cloud computing nodes and perform operations on them through a service management API provided by the cloud computing provider. If a user doesn't have an existing management certificate for a cloud computing provider, one could be automatically created and upload to the cloud computing provider certificate store for the user's subscription using a user's log-in credentials.

In the present example, the user profile is linked to a universal identifier used across a number of different systems and/or platforms. In the particular examples illustrated, the universal identifier is a Windows Live® Id authentication mechanism as used by various technologies available from Microsoft® Corporation of Redmond Wash. The Windows Live® Id links the service to a cloud provider (in this case, Windows Azure™ available from Microsoft® Corporation of Redmond Wash.). Referring now to FIG. 3, an example of a user interface page that may be provided by the portal user interface 210 illustrated. The user interface page includes a sign in interface 302 that allows a user to enter a username and password.

As illustrated in FIG. 4A, a user is then provided a user interface to identify a particular subscription to an HPC provider. Once a subscription id is provided by the user, the system allows for a certificate to be generated and uploaded to the HPC provider to facilitate subsequent operations. The provisioning service also allows user to supply a username/password to create an admin account on the cluster for the user to manage the cluster through various tools, such as for example, using the Remote Desktop Protocol. As illustrated in FIG. 4A, the user profile and related components then can be used to automatically generate the account information and resources to provision a service in the user's subscription if so specified by the user. In particular, FIG. 4A illustrates that a user can specify automatically generating new cloud computing account information. For example, embodiments may auto-generate cluster resources such as storage resources, database resources, certificate resources, service resources, etc.

In some embodiments, management of user state and user profiles could be used for the provisioning process. For example, some embodiments could use a universal log-in, such as a Windows Live® Id and/or a subscription id, and/or a user profile. These could be used to automatically find existing cloud service subscriptions and to automatically use those descriptions. Additionally or alternatively, a user log-in may be used to pre-generate storage names, find databases, identify where certificate information is stored, identify where other information is stored, etc. based on the user log-in. For example, user preferences associated with the log-in may be used to perform these tasks. Alternatively or additionally, previous user actions may be used to determine how these tasks are performed.

Alternatively, as illustrated in FIG. 4B, a user can specify resources already existing for a particular user account. For example, FIG. 4B illustrates that a user can identify their already existing cloud service, storage account, storage key, or database account.

Referring to FIG. 5A, a user can also specify various cluster features for a new cluster. For example, the user can specify the number of nodes that a cluster will have, the size of the nodes, and deployment roles for the clusters. Further, as illustrated in FIG. 5B, a user may specify advanced configuration options. For example, the user may specify application and/or data files to upload to a cluster.

New provisioning requests are submitted to the job scheduler 206 and are scheduled as HPC jobs. Referring once again to FIG. 2, a cluster creator API 212 is provided in the provisioning service 202 that encapsulates deployment capabilities. This API 212 is responsible for interacting with the job scheduler 206. The job scheduler 206 can interact with one or more workers, such as worker 214 to provision the service 204. The core pieces of the API 212 can be encapsulated and exposed externally by a user interface using user interface logic, as well for other applications to take advantage of the deployment capabilities outside of the scope of the provisioning service 202. The API 212 can wrap around the scheduler 206 and other parts of the scheduler.

Once the user's web service 204 is provisioned, some embodiments may provide a user interface element, such as a link to a Remote Desktop Protocol interface to the instances. Alternatively or additionally, embodiments may provide further integration with the portal user interface 210 to the users service 204 as provided by a front end on the Tier 1 of the provisioning service 202.

Some embodiments may have a heat-map component that is made available to the portal user interface 210. The heat map can be used to graphically demonstrate various performance and usage features of a provisioned service, such as the service 204. In particular, a heat map may be used to graphically illustrate various performance counters such as processor usage, network usage, memory usage, number of pending jobs, etc. To simplify provisioning, the heat-map may be persisted entirely in memory. In one embodiment, the heat map data can also be exposed via an API to the provisioning portal user interface 210 in Tier 1.

FIG. 2 further illustrates a provisioning database 216. Data about the configurations of customer HPC clusters are stored in the provisioning database 216 of the provisioning head node scheduler 206. Provisioning statuses can be communicated through job progress messages. Operations to the custom HPC clusters such as start, cancel, rollback, shutdown may also be submitted to the provisioning head node scheduler 206 as jobs. Dependencies in the workflow (e.g., provisioning of a cluster needs to finish before running an app) are implemented through task dependencies within a job. The scheduler 206 on the provisioning head node becomes the interface between provisioning portal user interface 210 and the provisioning workers 214.

Embodiments may further include additional functionality associated with the portal user interface 210. For example, a user can use the user interface 210 to view previously deployed clusters and make changes to the clusters. Alternatively or additionally, the user can use the user interface 210 to perform retrieval of provisioning status from the job scheduler 206.

Some embodiments may include functionality for performing usage tracking. In particular, various user clusters, such as the service 204 may report resource usage to the provisioning service 202, which can then provide such information to a user through the user interface 210.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
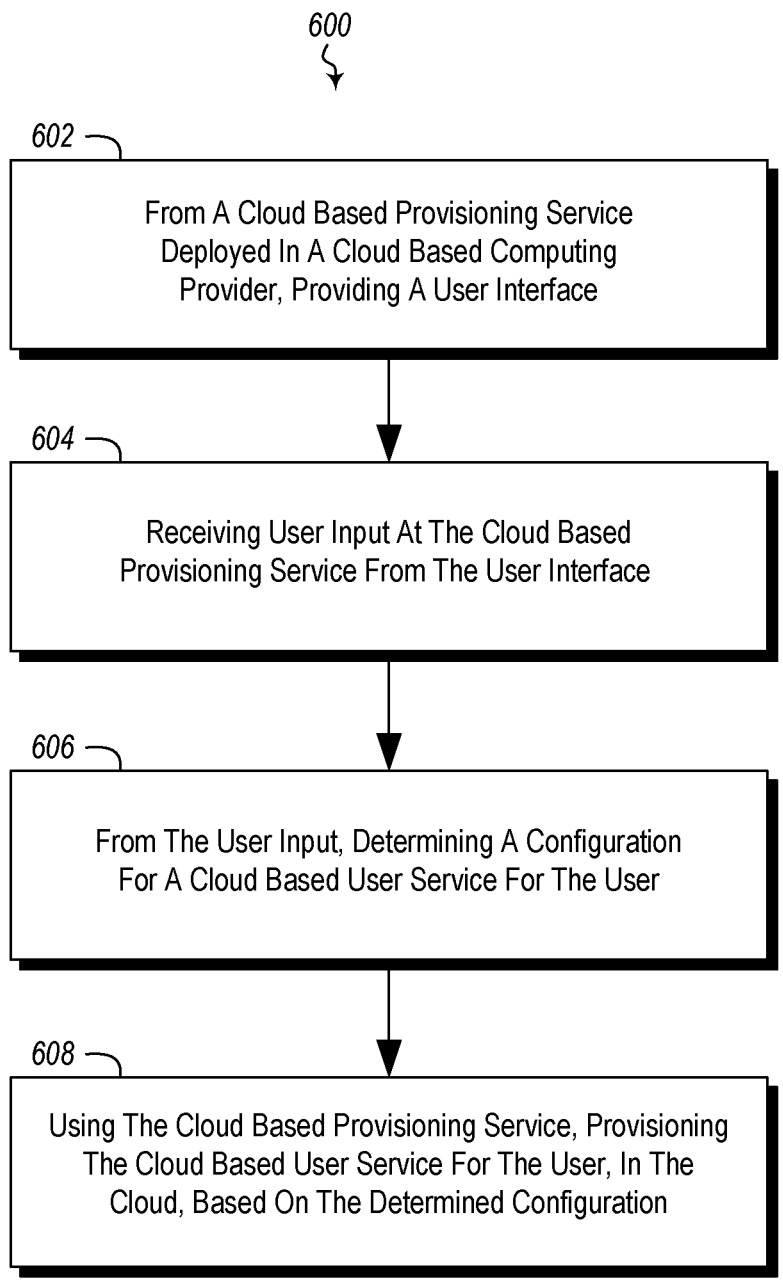
FIG. 6 illustrates a method of provisioning a cloud based high performance computing cluster.

Referring now to FIG. 6, a method 600 is illustrated. The method 600 may be practiced in a computing environment and includes acts for provisioning a cloud based high performance computing cluster. The method includes, from a cloud based provisioning service deployed in a cloud based computing provider, providing a user interface (act 602). Various user interfaces are illustrated herein, such as those illustrated FIG. 3 through 5B.

The method 600 further includes receiving user input at the cloud based provisioning service from the user interface (act 604). For example, such user input may include a user providing sign-in information such as is illustrated in FIG. 3 and FIG. 4A. Alternatively or additionally, such user input may include a user specifying one or more of an already existing cloud service, an already existing storage account, an already existing storage key, or an already existing database account as illustrated in FIG. 4B. Alternatively or additionally, such user input may include a user specifying one or more of a number of nodes, size of nodes, or roles of nodes as illustrated in FIG. 5A. Alternatively or additionally, such user input may include a user uploading one or more applications or data files as illustrated in FIG. 5B.

The method 600 further includes from the user input, determining a configuration for a cloud based user service for the user (act 606). For example, in some embodiments, receiving user input at the cloud based provisioning service from the user interface includes receiving user log-in information and determining a configuration for a cloud based user service for the user includes using the log-in information to determine configuration settings. As a further example, using the log-in information to determine configuration settings includes pre-generating storage names based on the log-in information. Alternatively or additionally, using the log-in information to determine configuration settings may include identifying one or more databases for the cloud based user service based on the log-in information. Alternatively or additionally, using the log-in information to determine configuration settings may include identifying one or more certificate locations for the cloud based user service based on the log-in information.

The method 600 further includes using the cloud based provisioning service, provisioning the cloud based user service for the user, in the cloud, based on the determined configuration (act 608). For example, in some embodiments, provisioning the cloud based user service for the user may include a worker in the cloud based provisioning service running a sequence of cluster provisioning steps as a job. FIG. 2 illustrates an example where a worker 214 may be used to provision a service 204. In some embodiments, provisioning the cloud based user service for the user may include automatically generating cluster resources including one or more of storage resources, database resources, or one or more certificates.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules, and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to operate a cloud-based provisioning service within a cloud environment by causing the cloud-based provisioning service to:
      provide a portal user interface that is configured to receive input for provisioning a service in a cloud-based computing cluster that is operating in the cloud environment, wherein the portal user interface includes:
         a viewing option configured to display adjustable configuration settings for one or more previously deployed computing clusters operating within the cloud environment and configured to receive input for initiating changes to those adjustable configuration settings, said viewing option being further configured to display information corresponding to an already existing storage key associated with the one or more previously deployed computing clusters; and
         a new cluster configuration option configured to provide new configuration setting options for provisioning a new computing cluster in the cloud environment;
      receive user input at the portal user interface, the user input specifying first configuration settings for initiating changes to the one or more previously deployed computing clusters or, alternatively, for provisioning the new computing cluster in the cloud environment; and
      based on the first configuration settings, either initiate the changes to the one or more previously deployed computing clusters or provision the new computing cluster in the cloud environmental,
      wherein the cloud-based provisioning service is configured as a multi-tiered web service that includes a first tier comprising the portal user interface and at least one additional tier comprising a scheduler that provisions the service in the cloud-based computing cluster, said first tier being stateless such that the portal user interface is also stateless.

2. The computer system of claim 1, wherein the viewing option is additionally configured to receive input specifying an identification of an already existing cloud service, an already existing storage account, or an already existing database account.

3. The computer system of claim 1, wherein the new configuration setting options include options for specifying a number of nodes that are to be included in the new computing cluster, a size of those nodes, or a role of those nodes.

4. The computer system of claim 1, wherein the new configuration setting options include options for uploading one or more applications or data files.

5. The computer system of claim 1, wherein the portal user interface is configured to receive log-in information and is further configured to use the log-in information to determine specific configuration settings.

6. The computer system of claim 1, wherein the portal user interface is configured to receive log-in information and is further configured to use the log-in information to pre-generate storage names.

7. The computer system of claim 1, wherein the portal user interface is configured to receive log-in information and is further configured to use the log-in information to identify one or more databases.

8. The computer system of claim 1, wherein the portal user interface is configured to receive log-in information and is further configured to use the log-in information to identify one or more certificate locations.

9. The computer system of claim 1, wherein the cloud-based provisioning service maintains user profiles for each of a plurality of users.

10. The computer system of claim 1, wherein the user input specifying the first configuration settings is used to provision the new computing cluster in the cloud environment, and wherein the new computing cluster is provisioned based on the first configuration settings.

11. The computer system of claim 1, wherein the user input specifying the first configuration settings is used to initiate the changes to the one or more previously deployed computing clusters, and wherein the one or more previously deployed computing clusters are changed based on the first configuration settings.

12. The computer system of claim 1, wherein the portal user interface is further configured to provide a retrieval option for performing retrieval of provisioning status from the scheduler of the cloud-based provisioning service.

13. A method for operating a cloud-based provisioning service within a cloud environment, the method comprising:
providing a portal user interface that is configured to receive input for provisioning a service in a cloud-based computing cluster that is operating in the cloud environment, wherein the portal user interface includes:
a viewing option configured to display adjustable configuration settings for one or more previously deployed computing clusters operating within the cloud environment and configured to receive input for initiating changes to those adjustable configuration settings, said viewing option being further configured to display information corresponding to an already existing storage key associated with the one or more previously deployed computing clusters; and
a new cluster configuration option configured to provide new configuration setting options for provisioning a new computing cluster in the cloud environment;

receiving user input at the portal user interface, the user input specifying first configuration settings for initiating changes to the one or more previously deployed computing clusters or, alternatively, for provisioning the new computing cluster in the cloud environment; and
based on the first configuration settings, either initiating the changes to the one or more previously deployed computing clusters or provisioning the new computing cluster in the cloud environment,
wherein the cloud-based provisioning service is configured as a multi-tiered web service that includes a first tier comprising the portal user interface and at least one additional tier comprising a scheduler that provisions the service in the cloud-based computing cluster, said first tier being stateless such that the portal user interface is also stateless.

14. The method of claim 13, wherein the portal user interface further includes a heat-map component that provides a heat map that graphically displays performance and usage features of a provisioned service operating on the one or more previously deployed computing clusters.

15. The method of claim 14, wherein the heat-map graphically displays one or more of processor usage, network usage, memory usage, or a number of pending jobs.

16. The method of claim 14, wherein the heat map is persisted entirely in memory.

17. The method of claim 14, wherein the heat map is exposed via an application programming interface (API) to the portal user interface.

18. The method of claim 13, wherein the cloud-based provisioning service bootstraps computing clusters.

19. The method of claim 13, wherein the cloud-based provisioning service provisions a head node and other related nodes in the cloud environment.

20. One or more hardware storage devices having stored thereon computer-executable instructions that are executable by one or more processors of a computer system to cause the computer system to operate a cloud-based provisioning service within a cloud environment by causing the cloud-based provisioning service to:
provide a portal user interface that is configured to receive input for provisioning a service in a cloud-based computing cluster that is operating in the cloud environment, wherein the portal user interface includes:
a viewing option configured to display adjustable configuration settings for one or more previously deployed computing clusters operating within the cloud environment and configured to receive input for initiating changes to those adjustable configuration settings, said viewing option being further configured to display information corresponding to an already existing storage key associated with the one or more previously deployed computing clusters; and
a new cluster configuration option configured to provide new configuration setting options for provisioning a new computing cluster in the cloud environment;
receive user input at the portal user interface, the user input specifying first configuration settings for initiating changes to the one or more previously deployed computing clusters or, alternatively, for provisioning the new computing cluster in the cloud environment; and
based on the first configuration settings, either initiate the changes to the one or more previously deployed computing clusters or provision the new computing cluster in the cloud environmental, wherein the cloud-based provisioning service is configured as a multi-tiered web service that includes a first tier comprising the portal user interface and at least one additional tier comprising a scheduler that provisions the service in the cloud-based computing cluster, said first tier being stateless such that the portal user interface is also stateless.

\* \* \* \* \*